US011537409B2

(12) United States Patent
Mickelsson et al.

(10) Patent No.: US 11,537,409 B2
(45) Date of Patent: *Dec. 27, 2022

(54) SYSTEM AND METHOD FOR MANAGING SYSTEM CONFIGURATION DATA MODELS

(71) Applicant: Forcepoint LLC, Austin, TX (US)

(72) Inventors: Tuomo Mickelsson, Helsinki (FI); Kari Nurmela, Helsinki (FI); Marko Niiranen, Helsinki (FI)

(73) Assignee: FORCEPOINT LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/188,185

(22) Filed: Mar. 1, 2021

(65) Prior Publication Data
US 2021/0182082 A1   Jun. 17, 2021

Related U.S. Application Data

(63) Continuation of application No. 15/907,658, filed on Feb. 28, 2018, now Pat. No. 10,936,333.

(51) Int. Cl.
G06F 9/44        (2018.01)
G06F 9/445       (2018.01)
H04L 41/0813     (2022.01)
G06F 8/30        (2018.01)
G06F 8/71        (2018.01)
H04L 41/22       (2022.01)

(52) U.S. Cl.
CPC ............ G06F 9/44505 (2013.01); G06F 8/30 (2013.01); G06F 8/71 (2013.01); H04L 41/0813 (2013.01); H04L 41/22 (2013.01)

(58) Field of Classification Search
CPC ......... G06F 9/44505; G06F 8/30; G06F 8/71; H04L 41/0813; H04L 41/22
USPC ....................................................... 717/108
See application file for complete search history.

(56) References Cited

U.S. PATENT DOCUMENTS 5,950,011 A     9/1999   Albrecht ............. G06F 9/44505
                                                         713/1
6,581,095 B1    6/2003   Kim ..................... H04L 41/0806
                                                         370/232

(Continued)

Primary Examiner — John Q Chavis
(74) Attorney, Agent, or Firm — Jackson Walker LLP; Christopher J. Rourk

(57) ABSTRACT

A system, for managing application specific configuration data, that receives, from a local server, a standardized configuration object, at a configuration engine, for a configurable entity, generates at least one configuration object file for the configuration entity, wherein the standardized configuration object is generated based on the application specific configuration data according to a system wide metadata specification. The system can further write each configuration object file to a shared memory structure associated with a configuration file of a configurable entity. The system receives the configuration object, compares the configuration object with another standardized configuration object, and interfaces the configuration object with the configuration engine. The interfaced configuration object can be a piece of configuration. The system permits read access to the configuration engine to the configuration object, permits read and write access to the management server to the configuration object. The local management server executes in a virtual container.

20 Claims, 3 Drawing Sheets

(56) References Cited

U.S. PATENT DOCUMENTS

| | | | |
|---|---|---|---|
| 6,912,710 B2 | 6/2005 | Broussard | G06F 8/71 |
| | | | 717/118 |
| 7,383,534 B1 | 6/2008 | Agbabian | G06F 8/71 |
| | | | 717/108 |
| 7,882,057 B1 | 2/2011 | Little et al. | |
| 7,945,613 B2 | 5/2011 | Devarakonda et al. | |
| 8,621,432 B2 | 12/2013 | Morris | G06F 8/34 |
| | | | 717/116 |
| 8,782,603 B2 | 7/2014 | Plate | H04L 63/1433 |
| | | | 717/121 |
| 9,020,880 B2 | 4/2015 | Little et al. | |
| 9,158,522 B2 | 10/2015 | Nyisztor | H04L 41/082 |
| 9,396,004 B1 | 7/2016 | Bester | G06F 9/44505 |
| 9,569,569 B1 | 2/2017 | Colon et al. | |
| 9,639,803 B1 | 5/2017 | Little et al. | |
| 10,296,732 B1 | 5/2019 | Sampemane et al. | |
| 10,296,741 B2 | 5/2019 | Hall et al. | |
| 10,297,144 B2 | 5/2019 | Haughawout et al. | |
| 10,298,010 B2 | 5/2019 | Worley et al. | |
| 10,298,489 B2 | 5/2019 | Williams et al. | |
| 10,298,593 B2 | 5/2019 | Oberg et al. | |
| 10,298,622 B2 | 5/2019 | Kaushansky | |
| 10,298,697 B2 | 5/2019 | Negishi | |
| 10,299,149 B2 | 5/2019 | Kleinbeck et al. | |
| 10,299,189 B2 | 5/2019 | Scarborough et al. | |
| 10,299,223 B2 | 5/2019 | Jha | |
| 10,299,278 B1 | 5/2019 | Jorgovanovic | |
| 10,936,333 B2 * | 3/2021 | Mickelsson | G06F 8/65 |
| 2006/0143220 A1 | 6/2006 | Spencer | G06F 8/20 |
| 2007/0214459 A1 | 9/2007 | Hsiao | G06F 9/541 |
| | | | 719/315 |
| 2011/0302571 A1 | 12/2011 | O'Farrell | G06F 16/27 |
| | | | 717/170 |
| 2013/0013766 A1 | 1/2013 | Britsch | B06F 9/4401 |
| | | | 709/224 |
| 2015/0212812 A1 | 7/2015 | Tripathi | G06F 8/60 |
| | | | 717/120 |
| 2015/0213053 A1 | 7/2015 | Ripberger | G06F 21/80 |
| | | | 707/736 |
| 2015/0220308 A1 | 8/2015 | Condon | G06F 8/20 |
| | | | 717/104 |
| 2015/0281285 A1 | 10/2015 | Bharali | G06F 16/00 |
| | | | 726/1 |
| 2017/0277769 A1 | 9/2017 | Pasupathy | G06F 16/285 |
| 2017/0357498 A1 | 12/2017 | Amiga | G06F 8/71 |
| 2018/0046339 A1 | 2/2018 | Naidoo | G06F 17/50 |

\* cited by examiner

SYSTEM AND METHOD FOR MANAGING SYSTEM CONFIGURATION DATA MODELS

This non-provisional application is a continuation of U.S. patent application Ser. No. 15/907,658 filed Feb. 28, 2018, which is hereby incorporated by reference for all purposes as if set forth herein in its entirety.

TECHNICAL FIELD

The present disclosure relates generally to managing data models and, more specifically, to systems and methods for securely and efficiently managing system configuration data models using decentralized configuration and installation procedures.

BACKGROUND

In network service architectures where there are a multitude of system configuration data models to manage, such as firewall configuration rules for firewall engines, configuration settings for email systems, logging facilities, and other configurations settings for other Operating System (OS) services relating to specific product platforms and where the services and products platforms may be many and the products and services operated are in a distributed network service environment, system complexity and security issues can dramatically effect system operation costs due to maintenance, development, and processing requirements. As demand for these services increases, the scalability requirements to meet the demand will also increase which will simply further exacerbate the issues.

SUMMARY

A system, for managing application specific configuration data, is provided that can improve upon the security and efficiency of rendering configuration changes for binaries on a computing device. The system can receive, at a configuration engine, a standardized configuration object, e.g. JSON object, for a configurable entity and generate at least one configuration object file for the configuration object. The standardized configuration object is generated based on the application specific configuration data according to a system wide metadata specification. Each configuration object file can be written to a shared memory structure associated with a configuration file of a configurable entity. The system can create the configuration object file from the received standardized configuration object using a configuration data parser, wherein the configuration object file comprises at least one of a C and C++ data structure. The system can generate an HTML UI to access and edit the standard configuration object. The system can receive, at a local management server, the configuration object, can compare the configuration object with another standardized configuration object, and can interface the configuration object with the configuration engine. The system can permit read access to the configuration engine to the configuration object, can permit read and write access to the management server to the configuration object. The local management server can execute in a virtual container.

In an embodiment, the present disclosure is directed to a system for managing application specific configuration data of a computing device. The system includes a storage resource and a processor that executes application code instruction to cause the system to receive, at a configuration engine, at least one standardized configuration object for at least one configurable entity and generate at least one configuration object file for each standardized configuration object received. The standardized configuration object can be generated based on the application specific configuration data according to a system wide metadata specification.

In another embodiment, the system executes application code instruction to write each configuration object file to a shared memory object structure associated with a configuration file of a configurable entity. The system further executes application code instruction to create the configuration object file from the received standardized configuration object using a configuration data parser, wherein the configuration object file comprises at least one of a C and C++ data structure. Wherein the standardized configuration object is a piece of JSON based configuration object. The system further executes application code instruction to generate an HTML UI to access and edit the standard configuration object In another embodiment, the system executes application code instruction to deactivate the configurable entity prior to writing the configuration object, if the configurable entity is activated; and activate the configurable entity after writing the configuration object; wherein deactivating and activating occurs over a control channel; wherein activating the configurable entity causes the configuration file to be loaded. Wherein the standardized configuration object is a JSON configuration object.

In yet another aspect, the system executes application code instruction to receive, at a local management server, the at least one standardized configuration object from a central management server; compare the standardized configuration object with another standardized configuration object in the storage facility; and interface the standardized configuration object with the configuration engine. Wherein the standardized configuration object is a JSON configuration object.

In still yet another aspect, the system executes application code instruction to receive, at a local management server, the at least one standardized configuration object from a central management server; compare the standardized configuration object with another standardized configuration object in the storage facility; interface the standardized configuration object with the configuration engine; permit read access to the configuration engine to the at least one standardized configuration object; and permit read and write access to the management server to the at least one standardized configuration object. Wherein the standardized configuration object is a JSON configuration object. Wherein the local management server can execute in a virtual container.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which.

DETAILED DESCRIPTION OF PREFERRED EMBODIMENTS

Figure 1:
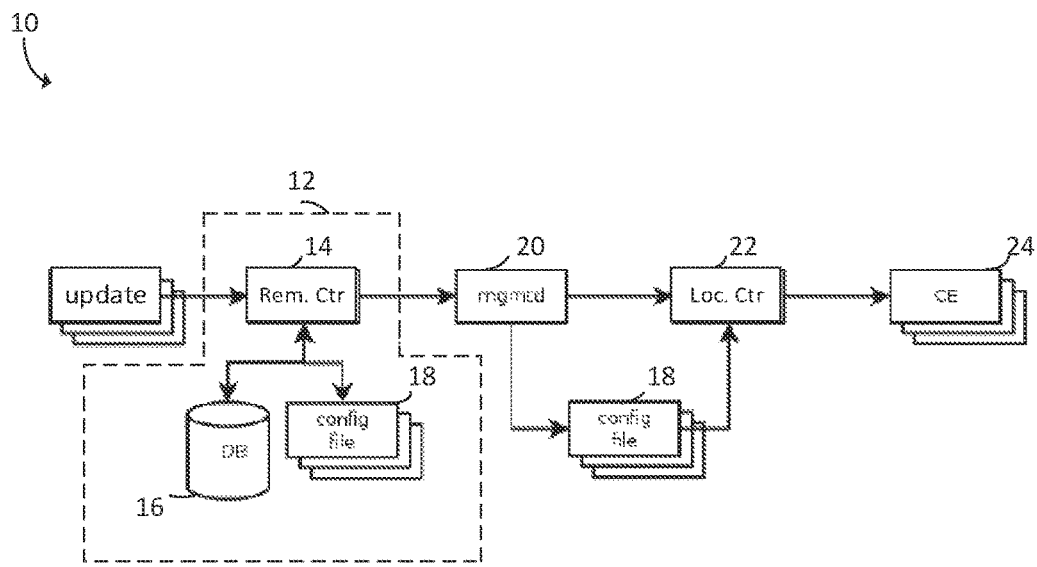
FIG. 1 is a block diagram of a system for uploading and installing text syntax based configurations files between a centralized service and a local configuration service engine, according to certain example embodiments.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

The example embodiments presented herein are directed to systems, methods, and computer program products for providing and installing configuration files and/or portions of configuration files using enhanced data models, processing, and communication architectures that operate more efficiently, reliably, and securely. In a use case, a network product, such as a router, requires periodic and often times frequent administration and maintenance of configuration settings for system binaries in order to ensure the product operates optimally, securely, and according to specification. In addition, network service architectures involve a multitude of network products and product types which can become quite challenging to efficiently, securely, and effectively manage. The system, methods, and computer program products address these issues using virtualized containers and a uniform configuration data model for updating or changing configuration settings for system binaries.

The methods and systems presented herein can efficiently implement dynamic editing, storing, and validation of software system configuration data and apply the software system configuration data, using metadata specification declared in standard data expression, such as JSON, which allows declaring complex structural data model with flexible type system and with related proprietary metadata for each target usage, and which is then converted or interpreted for accessing, storing, validating and applying configuration data through standardized formats and interfaces, like JSON Schema, GraphQL API, and programming language source code. Stated differently, the systems and methods presented herein can process application specific configuration data for a multitude of system applications, automatically generate a standard configuration data structure that includes the metadata and values for each system application configuration data processed, test and validate the data structure, determine a new piece of configuration data structure, and apply the new piece of configuration data structure. Again, providing additional guidance, meta data and values for a configuration file associated with a particular system application can be provided and the meta data and values can be mapped to a standard data structure for testing, validation, storing, accessing, and application.

Referring to FIG. 1, illustrated is a block diagram of a system for uploading text syntax based configurations files, according to certain example embodiments, denoted generally as 10. The system 10 comprises a remote centralized platform 12 communicable coupled with a Local Management System (LMS) of a product platform, such as a router. In an example embodiment, the centralized platform 12 comprises a remote controller 14, database 16, and configuration files 18. The remote controller 14 is communicable coupled with the local product platform through a communications management daemon (mgmtd) 20. The LMS, in an example embodiment, can include the mgmtd 20, a local controller 22, a storage facility for storing received configuration files 18, and a plurality of configurable entities (CEs) 24, e.g. inspection, kernel, sendlogd, etc. The remote controller 14 can securely receive dynamic update packages, e.g. from user of the system or a 3rd party service provider. The remote controller 14 stores the packages into the database 16 together with the custom configuration elements. The text based configuration files 18 are created in the remote controller 14 using object relational mapping between Java objects and the database 16 and the configuration generation Java code. The configuration generation can be defined as the act of translating the configuration data in the management system into the data structures used by the components on the engine. The configuration files 18 are sent to mgmtd 20. The mgmtd 20 stores the configuration files 18 on the local product platform and when all the configuration files 18 have been uploaded, mgmtd 20 launches a local controller 22 using a command line tool. The text based configuration files 16 are parsed by the corresponding parsers in the local controller 22.

Each configuration, i.e. a data structure generated from one or more of the text configuration files (policy.sgc, config.txt, etc.) used by one or more of the CEs, is created by local controller 22 from the parsed representation of the configuration file 18 using the configuration generation C code. In many cases, the created configuration is serialized before sending it to the CE 22, and then de-serialized by the CE. In some cases, yet another data structure is created by the CE from the received data structure. The policy upload protocol between remote controller 14 and mgmtd 20 has two phases after transferring the actual configuration files: "check" generates the configuration and passes it to the CEs, and "apply" that requests the local engine 22 to take the configuration into use. Similarly, the communication between local engine 22 and the CEs 24 has several steps—send, lock, commit, and unlock, where "commit" takes the new configuration into use. In prior solutions, the sgcfg "apply" command would regenerate and retransmit the configuration to CEs before the actual apply part, where the CEs 24 just take the new configuration into use. In such prior solutions, configuration generation works so that sgcfg has parsers for the text configuration files. The parsers produce a relatively straight-forward C struct representation of the configuration file content. From these C structs the actual configuration is then generated and communicated to the corresponding CE(s).

A problem with the above configuration is that the generation of configuration files are performed centrally which requires a lot of resources, e.g. processing, storing, and serialization, and can result in a less secure environment as the central processing facility can be more easily compromised. The LMS interfaces with the remote controller 14 through a set of APIs. In this configuration, the LMS is started after initial configuration. This action has consequences. For example, the initial policy needs to be applied without the LMS so that a browser can connect to the local controller 22. The APIs implement some functions that would clearly belong to the LMS but because they are needed in the initial configuration, a separate implementation has been made. The LMS API needs to keep track of the state of the initial configuration, because there is no management system or database available yet. This issue is eliminated when the LMS manages the configuration process.

A goal of the disclosed systems, methods, and computer program products is to offload a large portion of the configuration generation work traditionally performed in the remote controller 14 to the local management system and associated entities. This can significantly improve the scalability of the dynamic updates. Another goal is to use a standardized data structure, such as JSON, so that the same data format is used throughout the system. This is not explicitly shown in FIG. 1 but is inherent in the application of FIG. 1 to the further disclosure herein. Another goal with respect to the standardized data structure is to provide pre-generated standardized data structures, from a central repository either commonly managed or managed by a 3$^{rd}$ party, to the local management system, which is also not explicitly shown but is inherent in the application of FIG. 1 to the further disclosure herein. This use of pre-generated standardized data structures avoids current translations found in the prior art, improves system performance, makes development and maintenance work easier and faster, and reduces infrastructure cost for the actual service provider. One aspect of this change is that the dynamic update package is available on the local controller separately, instead of bundling the resolved data into the old text syntax configuration files, like policy.sgc, config.txt, etc. The configuration given essentially just contains the necessary custom configuration elements. This means that the configuration generation is rather different from any prior solution where the goal was to generate text configuration syntax in remote controller 14 so that the work on the local controller 22 would be easier. It is easier to scale up in large environments by offloading tasks from the centralized remote controller 14 to the large number of local controller components, i.e. distributed computing. In addition, using a common meta data specification makes managing updates simpler, more cost effective, and secure since separate data models for the local controllers requires more translations and processing data from 3$^{rd}$ parties that may not be trusted. Yet another goal is to use virtual container that create a secure partition between the storage and processing facility of the custom configuration elements and the engine that actually renders the custom configuration elements.

Figure 2:
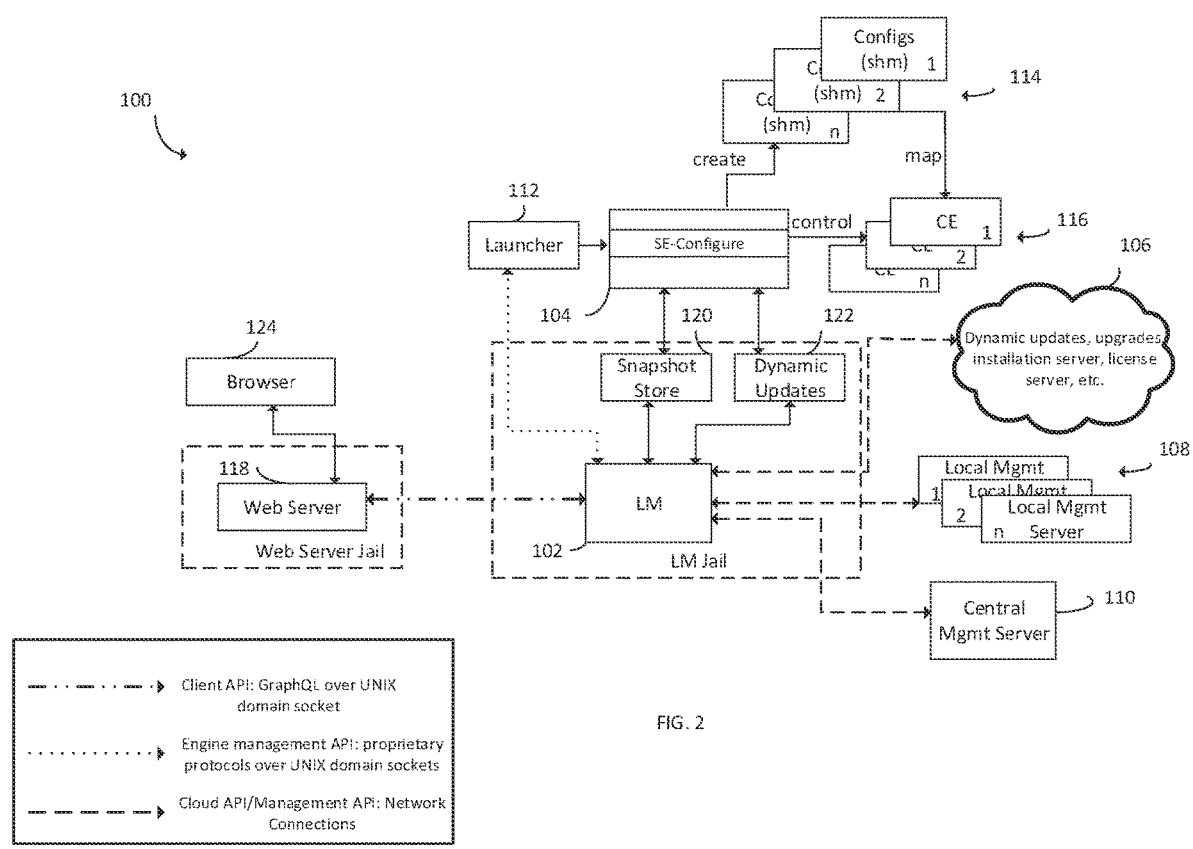
FIG. 2 is a block diagram of a system architecture for receiving, processing, and installing JSON syntax based configuration files in a distributed manner between a centralized service, a local management service, and a local configuration service engine, according to certain example embodiments.

Referring now to FIG. 2, illustrated is a block diagram of a system architecture for receiving, processing, generating, and installing JSON syntax based configuration files and/or pieces thereof, according to certain example embodiments, denoted generally as 100. The architecture 100 includes a Local Management (LM) server 102 and a secure configuration (se-configure) engine 104. The LM 102 receives updates, upgrades, and dynamic updates from at least one of cloud services 106, a central management server 108, or other local management servers 110. In practice, the dynamic updates are JSON based configuration syntax generated from application specific configuration files provided to the aforementioned system components. In this embodiment, the LMS 102 and se-configure engine 104 are executed from a common platform, although the LMS 102 can be executed and ran from its own virtualized container. Other components that can be a part of the common platform, or optionally ran from another platform, include a launcher daemon 112, shared memory resources 114, CEs 116, web server 118, snapshot store 120, and dynamic updates store 122. Components external to the common platform can include cloud services 106, local management servers 108, central management server 110, and an HTML browser 124. The web server 118 can also be ran from a virtual container. In essence, the se-configure engine 104 can receive a standardized configuration object for a configurable entity from the LM 102 and generate a configuration object file for the standardized configuration object. The standardized configuration object is generated based on the application specific configuration data according to a system wide metadata specification.

In system architecture 100, all configuration changes go through the LM 102, including the first policy apply after a reboot. Furthermore, the very first (initial) policy uploads are already performed by the LM 102 before the se-configure engine 104 is taken into use. In addition, only LM 102 runs the se-configure engine 104, except when running it manually from command line during troubleshooting/debugging. This simplifies the architecture 100 compared to prior solutions where there are multiple entities that can change configuration files and launch the local controller 22 potentially in parallel. In other words, for the most secure use, the LM 102 should be a single binary that is the only entity to have privileges to run se-configure engine 104— except for those with privileges to execute over a command line interface. LM 102 can use se-configure engine 104 through a protocol over a stream type UNIX domain socket. Opening a connection in the socket creates a new instance of se-configure engine 104. There should be only a single se-configure engine 104 running at any given time, and thus only a single open connection over the UNIX domain socket.

The LM 102 stores the received JSON configurations and application binaries in the dynamic updates store 122. The LM 102 fetches or automatically receives new dynamic updates from cloud service 106, local mgmt. server 108, or central server 110. The pieces of configurations are kept in the snapshot store 120 where the se-configure engine 104 has read access. The system architecture 100 differs from the text based configuration syntax (policy. sgc, config.txt, etc.) of prior solutions in that the dynamic update package metadata and values are available on the se-configure engine 104 separately and the LM 102 gives only the necessary custom elements to the engine. The LM 102 can generate the custom configuration data based on the difference in the configuration files in the snapshot store 120 and the dynamic updates store 122. Alternatively, the SE-configure engine 104 could make the determination and perform the generation. The se-configure engine 104 generates the actual configurations necessary to interface with the CE's from the pieces of (JSON) configuration data. The se-configure engine 102 after instantiation can provide or apply an initial dynamic update provided by the LM 102. For each configuration change that is applied through se-configure engine 104, a JSON export snapshot is created in the snapshot store 122.

The snapshot store 122 is readable by se-configure engine 104. The LM 102 opens a connection through UNIX domain socket to se-configure engine 104. The connection can go to a small launcher daemon 122 that forks and executes, e.g. using exec Linux shell command, the actual se-configure engine 104 with appropriate privileges and capabilities, redirecting the UNIX domain socket to stdout/stdin, and forwarding stderr to a debug log. In this manner, se-configure engine 104 is slightly better isolated and can be kept as a pure command line tool to make component/unit testing easier. Then the LM 102 can indicate which virtual contexts the configuration change should be applied to, and which snapshots each of those virtual contexts uses currently, and which snapshots should start being used. This covers creating a new virtual context and deleting an existing virtual context.

A piece of JSON configuration is read by the se-configure engine 104 when the relevant next snapshot(s) differ from previous snapshot(s) and/or the running state obtained from the OS, in a way indicating that the current piece of configuration may not be up to date. For some system configurations, e.g. network configuration, there is no single configuration data structure but the OS configuration is updated by the se-configure engine 104 during the configuration "commit" stage instead. The pieces of configuration of the components are typically C data structures in shared memory, mapped to the same address in se-configure engine 104 and the user(s) of that piece of configuration, avoiding the need for serialization/deserialization. Any errors and warnings detected during the configuration generation are communicated back to the LM 102, allowing the LM 102 to make stop/go decision before the changes are actually applied. The configuration files in database 16 are not used in the architecture 100. Instead, attributes in the se-configure engine 104 are set or modified. This is to keep configuration data in the same place, to make the data visible to LM 102, and to facilitate UI for these attributes more easily, if needed. To support the current functionality where a configurable parameter is not visible in the UI, but it is possible to change that locally on the se-configure engine 104 in emergency situations, command line tools can be used to edit those values.

The se-configure engine 104 can also start and stop daemons depending on the configuration changes. For this, se-configure engine 104 checks whether the daemon is running currently to know if it needs to be started or stopped. Similarly, se-configure 104 can query the current OS network configuration to find out what kind of changes are needed during the policy apply. For example, the actual current network configuration may not correspond to the configuration previously uploaded and this may need to be addressed before a configuration update. Se-configure engine 104 can start the necessary daemons for service activation after policy changes and can restart daemons if a service crash occurs during activation. In essence, the se-configure engine 104 provides the necessary pieces of the current configuration to a service daemon or daemons and can stop, start, and restart the daemon or daemons and other dependent service daemons as well as configuring the OS, if needed, in order to get the service daemon or daemons in an operational state.

The se-configure engine 104 reads configuration JSON data and generates each piece of configuration and writes the piece of configuration to the CE or CEs 116. The JSON configuration data access can be implemented largely in C++ to facilitate easier and safer error handling and JSON data access by the se-configure engine 104. The JSON configuration data model and format can be defined by a "storage schema" called also the "master schema" using a custom format, see FIG. 3. This schema can be converted to various other formats, including JSON schema (v4) for validation, validation and test data, and GraphQL schema. The JSON data received can be parsed by a configuration data parser implemented in C++. For example, A parsed JSON value is called a dictionary value and the data types and functions to access and manipulate that data are in the Dictionary and in DictPointer modules of the C++ parser. The configuration data parser can generate the C or C++ data structures necessary to update a CE. the configuration data, and communicate the resulting configuration data, or piece of configuration data, directly with the CE(s) 116.

Figure 3:
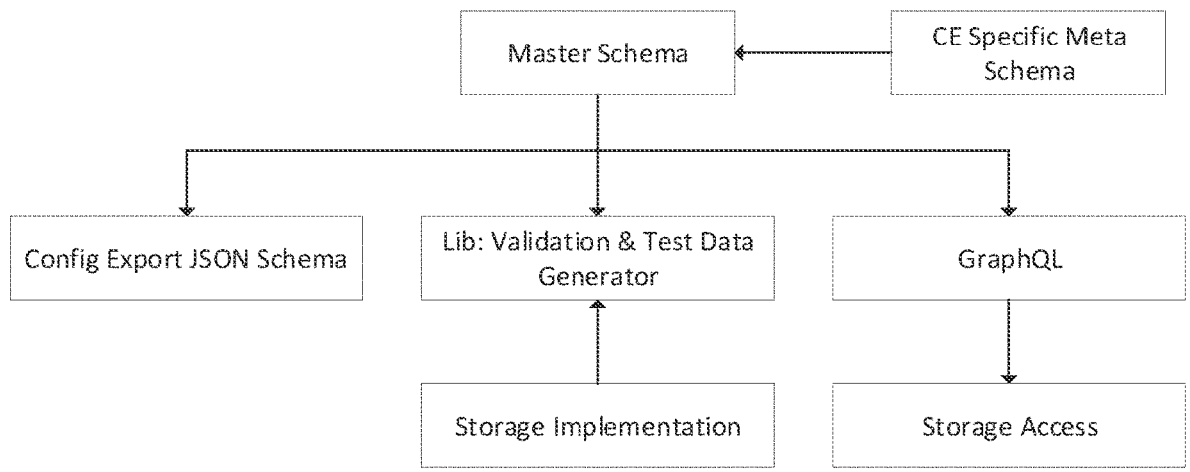
FIG. 3 is a block diagram of a data model specification generated by a master schema and defined by a meta schema for communications and processing between the local management service and the local configuration service engine, according to certain example embodiments.

In reference to FIG. 3, a metadata specification also called master schema can be used to process application specific meta data and values for a CE and generate a JSON configuration data, validate the JSON configuration data, read and interpret the metadata specification to direct a custom database backend for storing the configuration data, and generate GraphQL and HTML schema for UI interactions. The metadata specification can comprise metadata for a plurality of different configuration files associated with different CE's. The metadata specification can be used to generate the common JSON configuration data used system wide for all CE's. Alternatively, XML DTD configuration data can be generated and validated. Additionally, a database schema to store the configuration data in a database can be used. Metadata can be attached to parts of the configuration data model for the UI to facilitate more generic implementation for rendering and editing the data model elements in proprietary UI code. There can be more than one UI (simplified/full) defined this way, working in parallel. Localization information can be attached to be used in the UI, e.g. UI labels in different languages. Custom code for handling the configuration data in various programming languages can be generated. Bindings to functions, classes, etc. in the metadata specification so that the configuration engine, configurable entity, UI, etc. can use the correct function, class, etc. when handling the configuration data can be added. Translations of the configuration data can be defined by additional information in the metadata specification. For example, remove unnecessary keys etc. from the configuration data uploaded from centralized management to a firewall engine; guide merging of configuration data changes from two sources: meta attributes can be used to define how to merge different elements (with possible hooks to code implementing the merge routines); translate configuration data for different configurable entity versions (and mark incompatibilities between configuration data parts and product versions); and provide default values for attributes, when configuration data does not include them.

Figure 4:
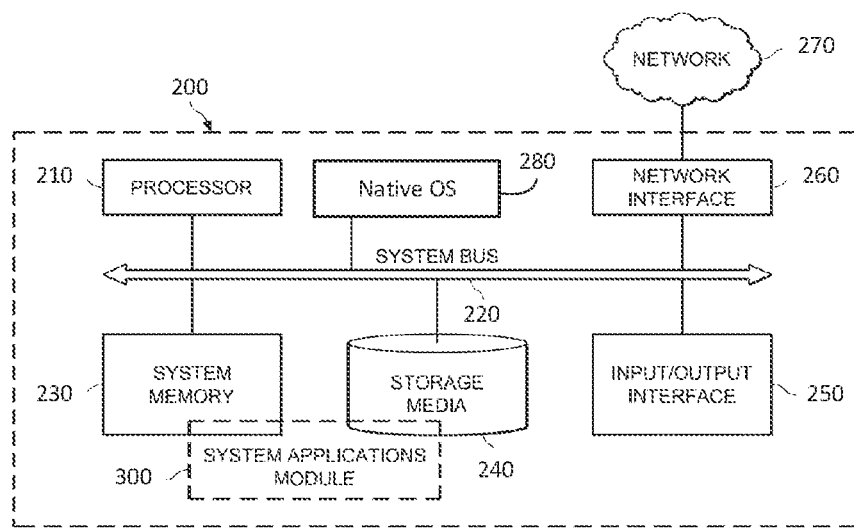
FIG. 4 is a block diagram depicting a computing machine and system applications, in accordance to certain example embodiments.

Referring now to FIG. 4, a computing machine 200 and a system applications module 300 is illustrated, in accordance with example embodiments. The computing machine 200 can correspond to any of the various computers, mobile devices, laptop computers, servers, embedded systems, or computing systems presented herein. The module 300 can comprise one or more hardware or software elements designed to facilitate the computing machine 200 in performing the various methods and processing functions presented herein. The computing machine 200 can include various internal or attached components such as a processor 210, system bus 220, system memory 230, storage media 240, input/output interface 250, a network interface 260 for communicating with a network 270, e.g. cellular/GPS, and a native Operating System (OS).

The computing machine 200 can be implemented as a conventional computer system, an embedded controller, a laptop, a server, a mobile device, a smartphone, a wearable computer, a customized machine, any other hardware platform, or any combination or multiplicity thereof. The computing machine 200 can be a distributed system configured to function using multiple computing machines interconnected via a data network or bus system.

The processor 210 can be designed to execute code instructions in order to perform the operations and functionality described herein, manage request flow and address mappings, and to perform calculations and generate commands. The processor 210 can be configured to monitor and control the operation of the components in the computing machine 200. The processor 210 can be a general purpose processor, a processor core, a multiprocessor, a reconfigurable processor, a microcontroller, a digital signal processor ("DSP"), an application specific integrated circuit ("ASIC"), a controller, a state machine, gated logic, discrete hardware components, any other processing unit, or any combination or multiplicity thereof. The processor 210 can be a single processing unit, multiple processing units, a single processing core, multiple processing cores, special purpose processing cores, co-processors, or any combination thereof. According to certain embodiments, the processor 210 along with other components of the computing machine 200 can be a virtualized computing machine executing within one or more other computing machines. The virtualized computing machine can be a hardware or software based virtual container.

The system memory 220 can include non-volatile memories such as read-only memory ("ROM"), programmable read-only memory ("PROM"), erasable programmable read-only memory ("EPROM"), flash memory, or any other device capable of storing program instructions or data with or without applied power. The system memory 220 can also include volatile memories such as random access memory ("RAM"), static random access memory ("SRAM"), dynamic random access memory ("DRAM"), and synchronous dynamic random access memory ("SDRAM"). Other types of RAM also can be used to implement the system memory 220. The system memory 230 can be implemented using a single memory module or multiple memory modules. While the system memory 230 is depicted as being part of the computing machine 200, one skilled in the art will recognize that the system memory 230 can be separate from the computing machine 200 without departing from the scope of the subject technology. It should also be appreciated that the system memory 230 can include, or operate in conjunction with, a non-volatile storage device such as the storage media 240.

The storage media 240 can include a hard disk, a floppy disk, a compact disc read-only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 240 can store one or more operating systems, application programs and program modules, data, or any other information. The storage media 240 can be part of, or connected to, the computing machine 200. The storage media 240 can also be part of one or more other computing machines that are in communication with the computing machine 200 such as servers, database servers, cloud storage, network attached storage, and so forth.

The system applications module 300 can comprise one or more hardware or software elements configured to facilitate the computing machine 200 with performing the various methods and processing functions presented herein. The module 300 can include one or more algorithms or sequences of instructions stored as software or firmware in association with the system memory 230, the storage media 240, or both. The storage media 240 can therefore represent examples of machine or computer readable media on which instructions or code can be stored for execution by the processor 210. Machine or computer readable media can generally refer to any medium or media used to provide instructions to the processor 210. Such machine or computer readable media associated with the module 300 can comprise a computer software product. It should be appreciated that a computer software product comprising the module 300 can also be associated with one or more processes or methods for delivering the module 300 to the computing machine 200 via the network 270, any signal-bearing medium, or any other communication or delivery technology. The module 300 can also comprise hardware circuits or information for configuring hardware circuits such as microcode or configuration information for an FPGA or other PLD. In one exemplary embodiment, module 300 can include algorithms capable of performing the functional operations described by the flow charts and computer systems presented herein for performing an on-line payment.

The input/output ("I/O") interface 250 can be configured to couple to one or more external devices, to receive data from the one or more external devices, and to send data to the one or more external devices. Such external devices along with the various internal devices can also be known as peripheral devices. The I/O interface 250 can include both electrical and physical connections for coupling the various peripheral devices to the computing machine 200 or the processor 210. The I/O interface 250 can be configured to communicate data, addresses, and control signals between the peripheral devices, the computing machine 200, or the processor 210. The I/O interface 250 can be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 250 can be configured to implement only one interface or bus technology. Alternatively, the I/O interface 250 can be configured to implement multiple interfaces or bus technologies. The I/O interface 250 can be configured as part of, all of, or to operate in conjunction with, the system bus 220. The I/O interface 250 can include one or more buffers for buffering transmissions between one or more external devices, internal devices, the computing machine 200, or the processor 210.

The I/O interface 250 can couple the computing machine 200 to various input devices including mice, touch-screens, scanners, electronic digitizers, sensors, receivers, touchpads, trackballs, cameras, microphones, keyboards, any other pointing devices, or any combinations thereof. The I/O interface 250 can couple the computing machine 200 to various output devices including video displays, speakers, printers, projectors, tactile feedback devices, automation control, robotic components, actuators, motors, fans, solenoids, valves, pumps, transmitters, signal emitters, lights, and so forth.

The computing machine 200 can operate in a networked environment using logical connections through the network interface 260 to one or more other systems or computing machines across the network 270. The network 270 can include wide area networks (WAN), local area networks (LAN), intranets, the Internet, wireless access networks, wired networks, mobile networks, telephone networks, optical networks, or combinations thereof. The network 270 can be packet switched, circuit switched, of any topology, and can use any communication protocol. Communication links within the network 270 can involve various digital or an analog communication media such as fiber optic cables, free-space optics, waveguides, electrical conductors, wireless links, antennas, radio-frequency communications, and so forth.

The processor 210 can be connected to the other elements of the computing machine 200 or the various peripherals discussed herein through the system bus 220. It should be appreciated that the system bus 220 can be within the processor 210, outside the processor 210, or both. According to some embodiments, any of the processor 210, the other elements of the computing machine 200, or the various peripherals discussed herein can be integrated into a single device such as a system on chip ("SOC"), system on package ("SOP"), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions unless otherwise disclosed for an exemplary embodiment. Further, a skilled programmer would be able to write such a computer program to implement an embodiment of the disclosed embodiments based on the appended flow charts, algorithms and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the description herein.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

Although specific embodiments have been described above in detail, the description is merely for purposes of illustration. It should be appreciated, therefore, that many algorithms or aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A system comprising a non-transitory data memory device and a processor having one or more algorithms stored in the non-transitory data memory device that are loaded onto the processor to configure the processor to perform predetermined functions, comprising:
    a local management server operating on the processor and configured to generate a plurality of standardized configuration objects;
    a configuration engine operating on the processor and coupled to the local management server by a secure connection, wherein the local management server has sole authority to access the configuration engine; and
    wherein the configuration engine is configured to generate custom configuration data including dynamic update package metadata using the standardized configuration objects according to a system wide metadata specification for an update package for each of a plurality of remote servers.

2. The system of claim 1 wherein the configuration engine is configured to write a modified configuration object file to a shared memory object structure associated with a configuration file of one of the plurality remote servers as a function of system wide metadata for a plurality of different configuration files.

3. The system of claim 1 wherein the standardized configuration object is a JSON based configuration object.

4. The system of claim 1 wherein the configuration object file comprises at least one of a C and C++ data structure and the local management engine uses the configuration engine through a protocol over a stream type UNIX domain socket.

5. The system of claim 1 wherein the local management server is configured to generate an HTML UI to modify the standard configuration object.

6. The system of claim 1 wherein the local management server is configured to deactivate the remote server prior to the generation of the custom configuration data.

7. The system of claim 6 wherein the local management server is configured to activate the remote server after generation of the custom configuration data.

8. The system of claim 6 wherein deactivating occurs over a control channel.

9. The system of claim 7 wherein activating occurs over a control channel.

10. The system of claim 7 wherein activating the remote server causes the configuration file to be loaded.

11. The system of claim 1 wherein the configuration engine is configured to compare the standardized configuration object with a stored standardized configuration object in a storage resource to generate the custom configuration data based on a difference between the standardized configuration object and the stored standardized configuration object.

12. The system of claim 11 wherein the configuration engine is configured to read the custom configuration data for one of the plurality of remote servers.

13. The system of claim 1 wherein the local management server is configured to permit read access to the configuration engine to at least one of the standardized configuration objects for one of the plurality of remote servers.

14. The system of claim 1 wherein the local management server is configured to permit read and write access to one of the remote servers to at least one of the standardized configuration object.

15. A method comprising:
    generating a plurality of standardized configuration objects using a local management server operating on a processor;
    coupling a configuration engine operating on the processor to the local management server by a secure connection, wherein the local management server has sole authority to access the configuration engine; and
    generating custom configuration data including dynamic update package metadata with the configuration engine, using the standardized configuration objects according to a system wide metadata specification for an update package for each of a plurality of remote servers.

16. The method of claim 15 further comprising writing a modified configuration object file to a shared memory object structure associated with a configuration file of one of the plurality remote servers using the configuration engine as a function of system wide metadata for a plurality of different configuration files.

17. The method of claim 15 wherein the standardized configuration object is a JSON based configuration object.

18. The method of claim 15 wherein the configuration object file comprises at least one of a C and C++ data structure and the local management engine uses the configuration engine through a protocol over a stream type UNIX domain socket.

19. The method of claim 15 wherein the local management server executes in a virtual container.

20. A method comprising:
   generating a plurality of standardized configuration objects using a local management server operating on a processor wherein the standardized configuration object is a JSON based configuration object;
   coupling a configuration engine operating on the processor to the local management server by a secure connection, wherein the local management server has sole authority to access the configuration engine;
   generating custom configuration data including dynamic update package metadata with the configuration engine, using the standardized configuration objects according to a system wide metadata specification for an update package for each of a plurality of remote servers; and
   writing a modified configuration object file to a shared memory object structure associated with a configuration file of one of the plurality remote servers using the configuration engine as a function of system wide metadata for a plurality of different configuration files.

* * * * *